G. R. DICE.
FLEXIBLE JOINT FOR DOLLS, &c.
APPLICATION FILED JUNE 21, 1915.
1,155,135.      Patented Sept. 28, 1915.
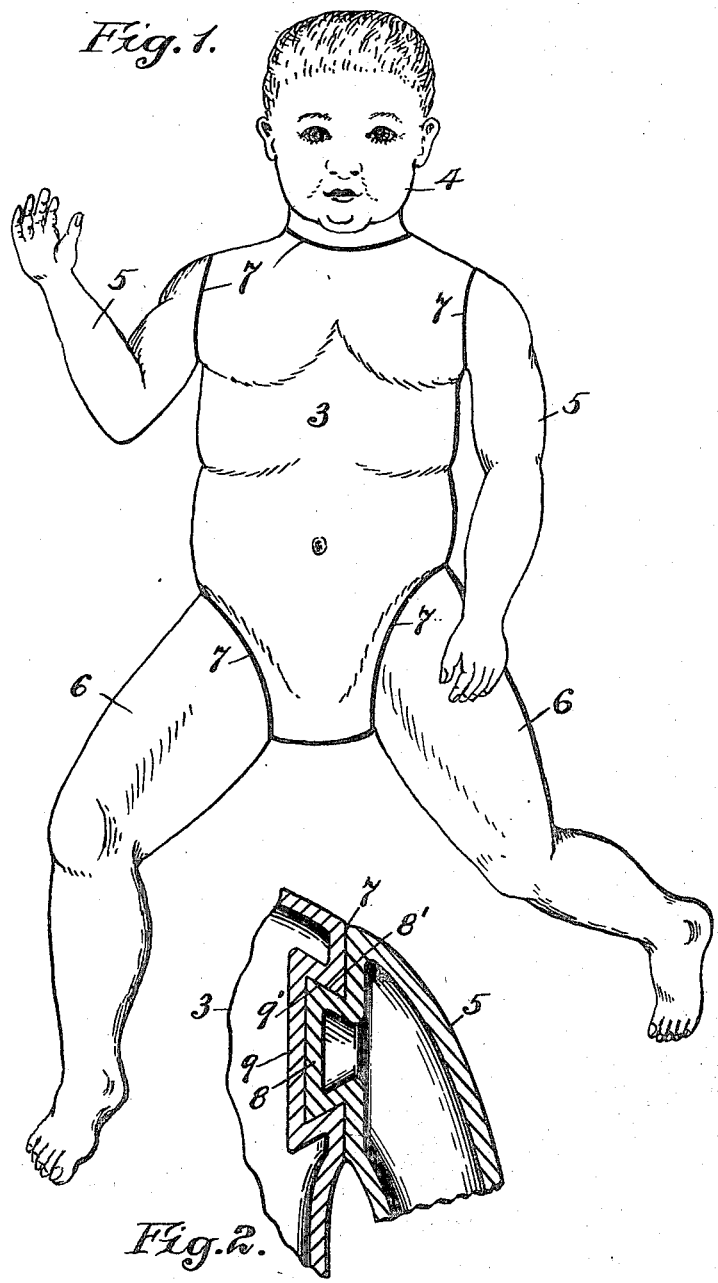

UNITED STATES PATENT OFFICE.

GEORGE ROBERT DICE, OF ASHLAND, OHIO.

FLEXIBLE JOINT FOR DOLLS, &c.

1,155,135. Specification of Letters Patent. Patented Sept. 28, 1915.

Application filed June 21, 1915. Serial No. 35,395.

*To all whom it may concern:*

Be it known that I, GEORGE ROBERT DICE, citizen of the United States, residing at Ashland, in the county of Ashland and State of Ohio, have invented certain new and useful Improvements in Fexible Joints for Dolls, &c., of which the following is a specification.

This invention relates to dolls and animal figures of other kinds, and has for its object to provide improved means for connecting the limbs or other members of such figures to the body thereof, and it is particularly applicable to dolls or other figures made of rubber or other elastic material. The members of such figures are ordinarily connected to 'the body by ball and socket joints including a rubber cord or the like. This is objectionable and costly for a number of reasons. By means of the present invention cords or the like are unnecessary, and the members can be joined in such manner as to permit movement thereof, the joints comprising a socket, preferably formed in the wall of the body, and a circular dove-tail tenon or projection formed on the limb or other member which can be sprung into the socket and be held therein by its own elasticity, permitting, nevertheless, the limb to be turned to various angles with respect to the body.

A doll embodying the invention is illustrated in the accompanying drawings, Figure 1 being a perspective thereof, and Fig. 2 a section of one of the joints.

A doll body is indicated at 3, the head at 4, the arms at 5 and the legs at 6, all joined to the body at 7, so that they can be turned to desired position.

The joint comprises a socket 9 formed in the wall of the body, this socket being circular in plan, and under-cut at the sides as indicated at 9'. The tenon or projection 8 is circular and has dove-tailed sides 8' corresponding to the sides 9' of the socket, the adjacent edges of the body and the limb or member fitting flatly against each other at the joint 7. The parts being made of rubber or similar material, the joint is effected by compressing the tenon 8 and slipping the same into the socket, when it will expand to fill or fit the socket, and the dove-tail construction holds it in place. The tenon is preferably made hollow so that it can be readily compressed. All of the joints desired can be made in this way, including not only the joints between the limbs or members and the body, but also the joints if any between different sections of the limbs. A particular advantage is that new members can be easily attached, by any one, in place of broken or injured parts.

The invention is not limited to the particular object illustrated but obviously can be used in connection with animal or other figures of any kind.

What I claim as new is:

1. A doll or other figure having two members one of which has a socket therein, and the other member of which is made of elastic material and has an integral projection entered into the socket when compressed and expanded therein to hold the members together.

2. A doll or other figure having two members one of which has a circular undercut socket, and the other of which is made of elastic material and has an integral circular projection entered into the socket when compressed and expanded therein to hold the members together.

3. A flexible joint for connecting two members of a figure, comprising a circular socket in one member, and circular elastic projection on the other member and integral therewith, sprung into said socket when compressed and expanded therein, said members having plane abutting surfaces around said socket and projections.

In testimony whereof, I affix my signature in presence of two witnesses.

GEORGE ROBERT DICE.

Witnesses:
CARL BERRY,
C. C. CHAPMAN.